US009444589B2

(12) United States Patent
Bhattad et al.

(10) Patent No.: US 9,444,589 B2
(45) Date of Patent: Sep. 13, 2016

(54) METHOD AND APPARATUS FOR PUNCTURING DATA REGIONS FOR SIGNALS TO MINIMIZE DATA LOSS

(75) Inventors: Kapil Bhattad, San Diego, CA (US);
Amir Farajidana, Sunnyvale, CA (US);
Juan Montojo, San Diego, CA (US);
Alexei Yurievitch Gorokhov, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 908 days.

(21) Appl. No.: 12/897,107

(22) Filed: Oct. 4, 2010

(65) Prior Publication Data

US 2011/0252139 A1    Oct. 13, 2011

Related U.S. Application Data

(60) Provisional application No. 61/248,805, filed on Oct. 5, 2009.

(51) Int. Cl.
*H04L 5/00* (2006.01)
*H04L 1/00* (2006.01)

(52) U.S. Cl.
CPC .......... *H04L 5/0007* (2013.01); *H04L 1/0013* (2013.01); *H04L 1/0068* (2013.01); *H04L 5/005* (2013.01); *H04L 5/006* (2013.01); *H04L 5/0037* (2013.01); *H04L 5/0064* (2013.01)

(58) Field of Classification Search
CPC . H04L 1/0003; H04L 1/0009; H04L 1/0013; H04L 1/0068; H04L 1/0069; H04L 5/0048; H04L 5/005
USPC ................................................ 370/329, 330
See application file for complete search history.

(56) References Cited

U.S. PATENT DOCUMENTS 8,094,737 B2 * 1/2012 Nguyen ................. 375/260
2006/0245384 A1 * 11/2006 Talukdar ............... H04L 1/0041
                                                    370/310

(Continued)

FOREIGN PATENT DOCUMENTS

CN       101483511 A     7/2009
JP       2009105898 A    5/2009

(Continued)

OTHER PUBLICATIONS

"Impact of DL CQI RS Insertion on Rel-8 PDSCH Performance", 3GPP TSG RAN WG1 #56bis R1-091230, Mar. 23-28, 2009, pp. 1-4.*

(Continued)

*Primary Examiner* — Scott M Sciacca
(74) *Attorney, Agent, or Firm* — Liem T. Do

(57) ABSTRACT

Methods and apparatuses are provided that facilitate puncturing codeblocks in resource blocks for muting or transmitting signals of a disparate technology such that the puncturing similarly impacts the codeblocks. Codeblocks can be mapped in order across frequency in a given data symbol before moving to a next data symbol. In this regard, utilizing data resource elements substantially evenly spaced across frequency and across data symbols in a data resource block for transmitting signals of the disparate technology can substantially equalize impact of the puncturing to related codeblocks. In addition, resources can be allocated to legacy devices, devices with bandwidth, data rate, or quality of service requirements, devices of a certain rank or geometry, etc., based at least in part on the puncturing. Moreover, a modulation and coding scheme can be selected for generating codeblocks based at least in part on the puncturing and its effect on performance.

33 Claims, 12 Drawing Sheets

(56) References Cited

U.S. PATENT DOCUMENTS

| | | | |
|---|---|---|---|
| 2007/0008943 A1* | 1/2007 | Grant | H04B 7/061 370/342 |
| 2007/0097915 A1* | 5/2007 | Papasakellariou | H04L 1/0003 370/329 |
| 2008/0232340 A1* | 9/2008 | Wan et al. | 370/343 |
| 2009/0109914 A1* | 4/2009 | McBeath et al. | 370/329 |
| 2009/0180464 A1* | 7/2009 | Walley et al. | 370/350 |
| 2010/0034299 A1* | 2/2010 | Love et al. | 375/260 |
| 2010/0039970 A1* | 2/2010 | Papasakellariou et al. | 370/310 |
| 2010/0098045 A1* | 4/2010 | Miyazaki | 370/342 |
| 2010/0278225 A1* | 11/2010 | Chun | H04L 5/0007 375/224 |
| 2010/0322184 A1* | 12/2010 | Xiao | 370/330 |
| 2011/0085516 A1* | 4/2011 | Pajukoski et al. | 370/330 |
| 2011/0128942 A1* | 6/2011 | Kim et al. | 370/336 |
| 2011/0235607 A1* | 9/2011 | Haustein | H04L 5/0048 370/329 |
| 2011/0286423 A1* | 11/2011 | Berggren et al. | 370/329 |
| 2011/0300890 A1 | 12/2011 | Hoshino et al. | |
| 2013/0064169 A1* | 3/2013 | Song et al. | 370/315 |

FOREIGN PATENT DOCUMENTS

| | | |
|---|---|---|
| WO | 2009088251 A2 | 7/2009 |
| WO | 2010106725 A1 | 9/2010 |

OTHER PUBLICATIONS

"CSI-RS Design for Virtuaiized LTE Antenna in LTE-A System", 3GPP TSG-RAN1 #58 R1-093152, Aug. 24-28, 2009, pp. 1-7.*
"UE-RS Patterns for LTE-A", 3GPP TSG-RAN WG1 #58 R1-093105, Aug. 24-28, 2009, pp. 1-9.*
International Search Report and Written Opinion—PCT/US2010/051537—ISA/EPO—Apr. 5, 2011.
Texas Instruments: "Multiplexing and Signaling Support for Downlink COMP", 3GPP DRAFT, R1-091292 TI DL COMP, 3rd Generation Partnership Project (3GPP), Mobile Competence Centre, 650, Route Des Lucioles, F-06921 Sophia-Antipolis Cedex, France, no. Seoul, Korea, 20090318, Mar. 18, 2009, XP050338899, [retrieved on Mar. 18, 2009].
ZTE, "Resource Mapping Issues on JP transmission in CoMP", 3GPP Draft, R1-090070 Resource Mapping Issues on JP Transmission in Comp, 3rd Generation Partnership Project (3GPP), Mobile Competence Centre , 650, Route Des Lucioles , F-06921 Sophia-Antipolis Cedex , France, no. Ljubljana, 20090107, Jan. 7, 2009, XP050318014.
LG Electronics,Details on CSI-RS Design for Higher-Order MIMO [online], 3GPP TSG-RAN WG1#57R1-092108,URL: http://www.3gpp.org/ftp/tsg_ran/WG1_RL1/TSGR1_57/Docs/R1-092108.zip, May 4-8, 2009.
Nokia, Nokia Siemens Networks, "On the impact of CSI-RS puncturing to Rel'8 PDSCH performance", 3GPP TSG RAN WG1 Meeting #57bis, R1-092557, Los Angeles, USA, Jun. 29-Jul. 3, 2009.
Samsung Electronics "LTE PHY Spec" [online] Jun. 24, 2008 pp. 01-77, XP002558928.
Samsung,Discussions on CSI-RS for LTE-Advanced [online],3GPP TSG-RAN WG1#58b R1-094089, URL: http://www.3gpp.org/ftp/tsg_ran/WG1_RL1/TSGR1_58b/Docs/R1-094089.zip, Oct. 12-16, 2009.
Samsung,Impact of DL CQI RS Insertion on Rel-8 PDSCH Performance [online], 3GPP TSG-RAN WG1#56 R1-090621,URL: http://www.3gpp.org/ftp/tsg_ran/WG1_RL1/TSGR1_56/Docs/R1-090621.zip, Feb. 9-13, 2009.
Taiwan Search Report—TW099133907—TIPO—Jun. 26, 2013.
Yoon H., et al., "Optimal modulation and coding scheme selection in cellular networks with hybrid-ARQ error control," Wireless Communications, IEEE Transactions, Dec. 2008.

* cited by examiner

METHOD AND APPARATUS FOR PUNCTURING DATA REGIONS FOR SIGNALS TO MINIMIZE DATA LOSS

CLAIM OF PRIORITY UNDER 35 U.S.C. §119

The present application for patent claims priority to Provisional Application No. 61/248,805 entitled "EFFICIENT PUNCTURING OF LEGACY UE DATA REGION FOR LTE-ADVANCED PURPOSE TO MINIMIZE DATA LOSS," filed Oct. 5, 2009, and assigned to the assignee hereof and hereby expressly incorporated by reference herein.

TECHNICAL FIELD

The following description relates generally to wireless communications, and more particularly to puncturing signals into data regions.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, base stations can assign resources to the mobile devices for communicating therewith, such as a portion of frequency over time. In an example, base stations can assign resources for data communications and for control data (which can relate to the data communications), and the base stations can encode data into codewords (e.g., or multiple codeblocks corresponding to the codeword) for transmission over the resources. In addition, base stations can transmit reference signals to the mobile devices. In an example, the mobile devices can measure the reference signals and report feedback to the base stations related to quality of the reference signals. In one example, base stations can allocate resources to the mobile devices based at least in part on the feedback. It is to be appreciated that the base stations can transmit reference signals for each antenna. Furthermore, for example, base stations can support communications from mobile devices using different technologies and can operate in a similar frequency space for the communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with puncturing data resources with disparate signals (e.g., signals related to a disparate technology) while minimizing loss over the data resources caused by the puncturing. For example, the data resources can be punctured and assigned to devices based at least in part on the puncturing. For example, resources that are not punctured can be allocated to devices that do not process the signals (e.g., legacy or different technology devices), devices with certain bandwidth, data rate, or quality of service requirements, devices of a certain rank, geometry, etc., to further minimize loss.

In addition, for example, resources punctured for transmitting the disparate signals can be substantially evenly spaced over a related frequency band and/or over related subsets of time for a period of time so as to impact the data resources substantially evenly. In this regard, for example, loss caused by the disparate signals to the data resources can be substantially equal for a given portion of the data resources. Moreover, in an example, a modulation and coding scheme can be selected for encoding data over the data resources based at least in part on the puncturing. Thus, for example, performance for the data resources can be estimated based at least in part on estimating performance of a most punctured portion of the data resources, and an MCS can be chosen based at least in part on the estimated performance. Furthermore, for example, resource puncturing can be used to mute data resources such that no signals are transmitted thereover.

According to an example, a method for wireless communication is provided that includes determining a punctured set of a plurality of data resource elements in one or more data resource blocks for muting or transmitting signals of a disparate technology. The method also includes allocating a portion of the plurality of data resource elements to one or more devices based at least in part on the punctured set of the plurality of data resource elements.

In another aspect, a wireless communications apparatus for allocating resources to one or more devices is provided that includes at least one processor configured to determine a punctured set of a plurality of data resource elements in one or more data resource blocks for muting or transmitting signals of a disparate technology. The at least one processor is further configured to allocate a portion of the plurality of data resource elements to one or more devices based at least in part on the punctured set of the plurality of data resource elements. In addition, the wireless communications apparatus includes a memory coupled to the at least one processor.

In yet another aspect, an apparatus for allocating resources to one or more devices is provided that includes means for determining a punctured set of a plurality of data resource elements in one or more data resource blocks for muting or transmitting signals of a disparate technology. The apparatus further includes means for allocating a portion of the plurality of data resource elements to one or more devices based at least in part on the punctured set of the plurality of data resource elements.

Still, in another aspect, a computer-program product is provided for puncturing codeblocks to mute or transmit signals, which includes a computer-readable medium having instructions for causing at least one computer to determine a punctured set of a plurality of data resource elements in one or more data resource blocks for muting or transmitting signals of a disparate technology. The computer-readable medium further includes instructions for causing the at least one computer to allocate a portion of the plurality of data resource elements to one or more devices based at least in part on the punctured set of the plurality of data resource elements.

Moreover, in an aspect, an apparatus for allocating resources to one or more devices is provided that includes a puncturing component that determines a punctured set of a plurality of data resource elements in one or more data resource blocks for muting or transmitting signals of a disparate technology. The apparatus further includes a resource allocating component that assigns a portion of the plurality of data resource elements to one or more devices based at least in part on the punctured set of the plurality of data resource elements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
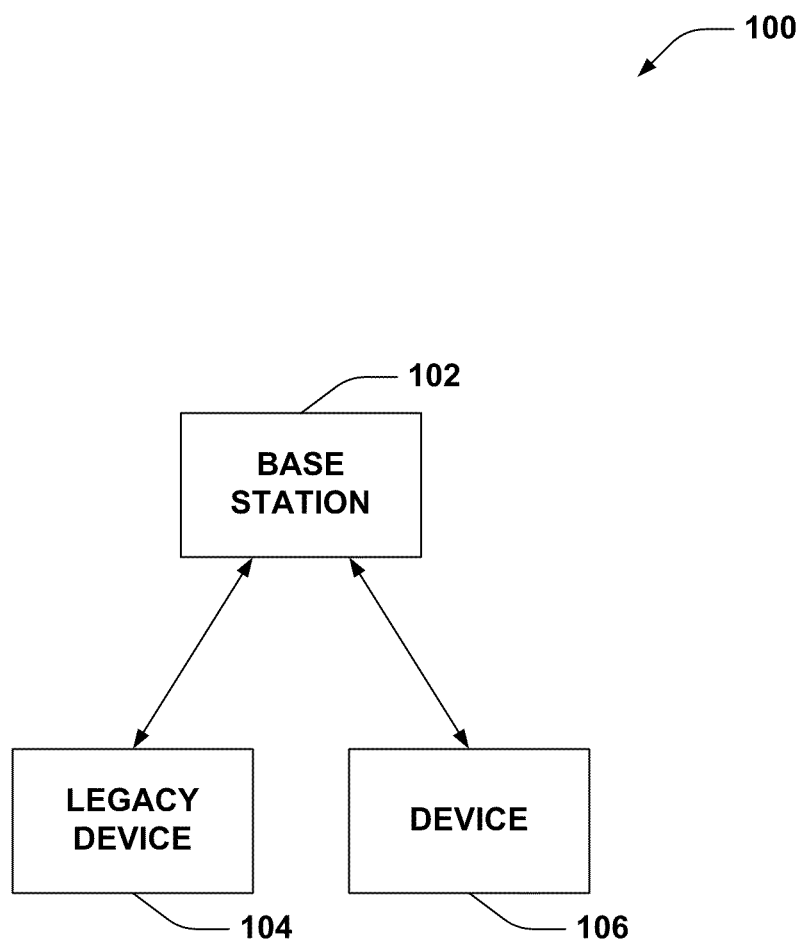
FIG. 1 illustrates an example system for communicating with various devices in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a set of data resources used to communicate with one or more devices can be punctured for transmitting disparate signals (e.g. signals related to a disparate technology). The set of data resources can be chosen such to minimize performance impact of the puncturing across the data resources. In one example, data mapping to the data resources for the one or more devices can be performed in order of frequency location and then across time. Thus, the set of data resources selected for transmitting the signals can be substantially even over the data resources with respect to frequency and time (e.g., data resources in the set can be spaced substantially equally apart). In this regard, the data resources used to communicate with one or more devices are similarly impacted by transmission of the signals.

In addition, for example, in view of the set of data resources selected for transmitting the new signals, data resources for the one or more devices can be scheduled to avoid the set of data resources to further mitigate impact of transmitting the disparate signals. For example, such data resource scheduling can be for devices unable to process the new signals, devices with certain bandwidth, data rate, and/or quality of service (QoS) requirements, devices of a certain rank, devices of a certain geometry, and/or the like. Moreover, for example, modulation and coding schemes (MCS) can be selected for encoding data related to the one or more devices based at least in part on a set of resources allocated thereto, a performance estimated for a most punctured set of data resources, and/or the like. Furthermore, in an example, punctured resources can be alternatively muted such that no transmissions occur over the punctured resources.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that supports legacy and non-legacy devices. System 100 includes a base station 102 that can communicate with legacy device 104 and device 106 to provide access to a wireless network (not shown). For example, base station 102 can be a macrocell, femtocell, picocell, or similar base station, relay node, mobile base station, UE (e.g., communicating in peer-to-peer or ad-hoc mode with legacy device 104 and/or device 106), a portion thereof, and/or substantially any device that provides one or more disparate devices with access to a wireless network. Moreover, for example, legacy device 104 and device 106 can each be a UE, modem (or other tethered device), a portion thereof, or substantially any device that can receive access to a wireless network, such as a relay node, a mobile or other base station, and/or the like. Legacy device 104 and device 106 can be of different technology types or revisions thereof, and thus can support different definitions of a similar set of resources.

According to an example, base station 102 can communicate with legacy device 104 (and/or one or more additional legacy devices) over data resources. As described, for example, the data resources can relate to a portion of frequency over time. Base station 102 can also communicate with device 106 over the data resources and can independently schedule legacy device 104 and device 106 over the data resources, providing separate data resources to each. Base station 102, however, can additionally transmit reference signals to device 106, and/or other devices of the same or similar technology as device 106, over the data resources, where the reference signals are not processed by legacy device 104. In this regard, base station 102 can puncture the reference signals into the data resources, which can impact communications with legacy device 104.

To minimize loss caused to communications with legacy device 104, base station 102 can puncture the data resources substantially equally with respect to frequency and time. Thus, for example, given a number of resource elements reserved for data transmission to legacy devices within one or more resource blocks, each defined by a portion of frequency over time, base station 102 can utilize substantially equally spaced resource elements over one or more resource blocks for transmitting the reference signals for device 106 and/or other devices of the same technology as device 106, effectively puncturing data previously scheduled for transmission over the resource elements. Puncturing can refer to replacing data scheduled for transmission in a certain resource element with other data (e.g., data related to the reference signal in the above example).

For example, base station 102 can encode data for legacy device 104 and/or device 106 into one or more codewords, which can be separated into one or more codeblocks for transmission over a plurality of resource elements. For example, each codeblock can have independent encoding, error detection (e.g., cyclic redundancy check), etc. In this example, puncturing a codeblock can refer to replacing at least one value in the codeblock that corresponds to a resource element with a disparate value. Moreover, for example, base station 102 can map codeblocks over the plurality of resource elements in order of frequency for a given subset of a period of time (e.g., a data symbol) before moving on to the next subset of the period of time. Thus, puncturing resource elements evenly over the frequency and over each subset of the period of time can result in similar impact to each of the codeblocks.

In another example, base station 102 can allocate resources to legacy device 104 based at least in part on avoiding data resources that are punctured by base station 102 for transmitting the reference signals. Thus, impact to legacy device 104 caused by reference signal transmission can be mitigated in this regard as well. Moreover, for example, base station 102 can similarly allocate resources to legacy device 104 or device 106 to avoid data resources that are punctured according to bandwidth, data rate, and/or QoS requirements of legacy device 104 or device 106, a rank or geometry thereof, and/or the like. Additionally, for example, base station 102 can select an MCS for encoding data related to legacy device 104 and/or device 106 based at least in part on the puncturing. Thus, for example, base station 102 can estimate an expected performance of a most punctured codeblock (e.g., to achieve a data rate for the most punctured codeblock), and can select the MCS based at least in part on the estimated performance. In yet another example, base station 102 can mute the punctured resources such that no data is transmitted thereover to legacy device 104 or device 106.

Figure 2:
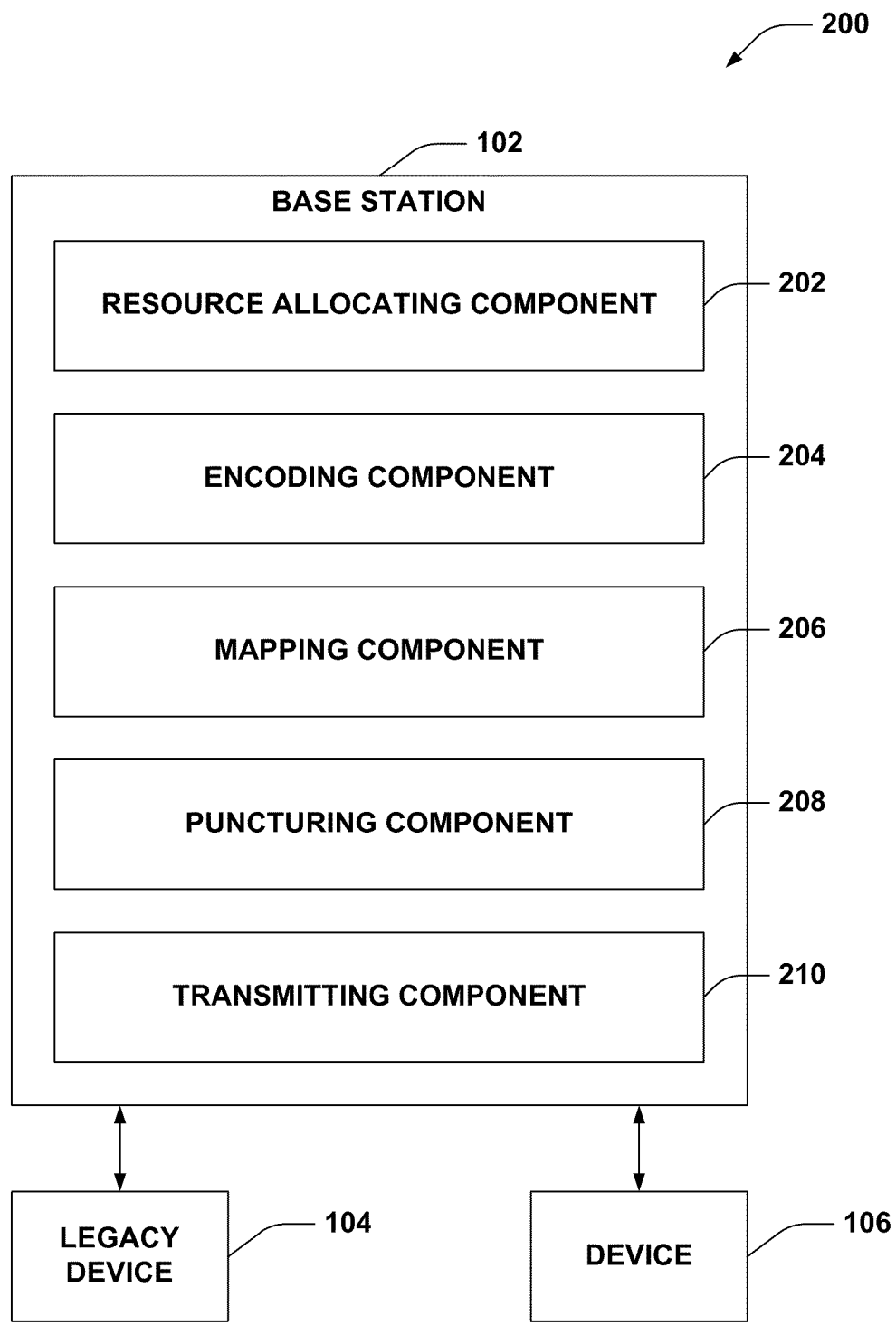
FIG. 2 illustrates an example system for puncturing codeblocks for muting or transmitting signals of a disparate technology.

Turning to FIG. 2, illustrated is an example wireless communications system 200 that facilitates puncturing data resources for transmitting signals of a disparate technology or muting transmissions. System 200 comprises a base station 102, which as described can provide network access to a plurality of devices, such as legacy device 104 and device 106. Base station 102 can include a resource allocating component 202 that assigns a set of resources to one or more devices for communicating with base station 102, an encoding component 204 that applies an MCS to data to generate one or more codewords for communicating to the one or more devices, and a mapping component 206 that associates the one or more codewords with a portion of the set of resources. Base station 102 also can comprise a puncturing component 208 that punctures a signal of a disparate technology into at least one of the one or more codewords, and a transmitting component 210 that transmits the one or more codewords over the set of resources.

According to an example, resource allocating component 202 can assign resources to legacy device 104 and/or device 106 for communicating therewith. For example, the resources can relate to a logical channel shared by legacy device 104 and/or device 106 (and/or other devices) for receiving data from base station 102, such as a physical downlink shared channel (PDSCH). Resource allocating component 202 can also assign control data resources and/or uplink data and control data resources to legacy device 104 and/or device 106. Moreover, for example, resource allocating component 202 can assign resources to legacy device 104 according to a legacy network specification. Resource allocating component 202 can also, for example, assign resources to legacy device 104 and/or device 106 based at least in part on a puncturing of the resources. In addition, encoding component 204 can apply an MCS to data for transmitting to legacy device 104 and/or device 106 to create one or more codewords. For example, the MCS can be used by encoding component 204 to generate the one or more codewords from bits of the data related to legacy device 104 and/or device 106 (e.g., based at least in part on a data rate).

In addition, for example, mapping component 206 can associate the one or more codewords to the assigned resources for transmitting to legacy device 104 and/or device 106. In one example, encoding component 204 can generate one or more codeblocks comprising a given codeword based at least in part on decoding capabilities at legacy device 104 and/or device 106. In addition, mapping component 206 can map the codeblocks to portions of the assigned resources. In one example, the assigned resources can comprise a number of resource elements, as described, and mapping component 206 can map the codeblocks over a plurality of the resource elements in order over frequency and then over time. Furthermore, puncturing component 208 can puncture signals related to the disparate technology into a portion of the codeblocks (e.g., over one or more resource elements to which the portion of the codeblocks are mapped).

Furthermore, as described in one example, puncturing component 208 can puncture into the portion of the codeblocks at the related resource elements substantially equally over the frequency and/or substantially equally over time to minimize impact to the codeblocks. Thus, for example, given a resource block that includes a plurality of contiguous or non-contiguous resource elements, puncturing component 208 can puncture the codeblocks in resource elements so that the punctured resource elements are spaced substantially equally apart in the resource block over a frequency and/or over a time period (e.g., a data symbol, a subframe, and/or the like, as described herein). In one example, puncturing component 208 can obtain a puncturing pattern from a hardcoding, configuration, specification, and/or the like. The puncturing pattern, for example, can include instructions related to which resource elements to puncture based at least in part on the number of symbols to transmit, the available resource elements, other resource block configuration information, etc. For example, this can change over time, and thus puncturing can be dynamic for different resource blocks. For example, resource allocating component 202 can assign resources to legacy device 104 and/or device 106 based at least in part on the puncturing pattern. In addition, for example, encoding component 204 can select an MCS for encoding data related to legacy device 104 and/or device 106 based at least in part on the puncturing pattern.

In another example, puncturing component 208 can select the resource elements based at least in part, for example, on a number of signals to send over a period of time. In one example, if a resource block includes 60 resource elements dedicated to transmitting data, and 6 signals are to be sent in the resource block, puncturing component 208 can puncture codeblocks in resource elements having an index of 0, 10, 20, 30, 40, and 50 for transmitting the 6 signals (and/or a shift of resource elements, such as 1, 11, 21, 31, 41, and 51, etc.), such that the resource elements punctured by puncturing component 208 are substantially equally spaced within the resource block to transmit the 6 signals. In another example, puncturing component 208 can select resource elements in given data symbols according to a position within the data symbols (e.g., select resource elements for puncturing that have index 0 in one or more data symbols within the resource block).

Thus, in one example, puncturing component 208 can determine resource elements for transmitting the signals based at least in part on dividing a number of resource elements (e.g., in one or more resource blocks) by a number of signals, and using the result to determine spacing between the resource elements selected for transmitting the signals. Moreover, for example, any remainder resulting from the division can be dropped, used to offset resource elements in a next one or more resource blocks for transmitting the signals, and/or the like. In another example, puncturing component 208 can determine the resource elements for transmitting the signals based at least in part on determining whether the signals can be sent in one resource element per data symbol across a resource block (e.g., number of signals divided by number of data symbols is less than or equal to one). If so, puncturing component 208 can substantially evenly spread the signals over the data symbols in the resource block. If not, puncturing component 208 can determine to pair signals by puncturing multiple resource elements within one or more data symbols. Thus, for example, puncturing component 208 can determine to puncture resource elements within the given data symbol substantially equally as well (e.g., such that the punctured resource elements are equally spaced within the data symbol).

Also, in this regard, selecting the set of resource elements can be dynamically performed for a given period of time at least since resource elements available for puncturing can change in a given resource block, subframe, radio frame, etc. In addition, for example, puncturing component 208 can similarly space puncturing over resource elements in multiple resource blocks. Also, in one example, the signals of the disparate technology can be reference signals transmitted for each antenna port of base station 102. Thus, for example, puncturing component 208 can determine a number of signals to transmit in a given time period based at least in part on the number of antenna ports, a specified density related to the antenna ports, and/or the like. Puncturing component 208 can then accordingly puncture the reference signals in the codewords by utilizing the corresponding resource elements, as described.

In yet another example, for transmitting one signal over one resource element in a given resource block, puncturing component 208 can determine the punctured resource elements according to the following formula: $(12k+freq\_offset, \pi_s(k))$, where k is the resource block index, $\pi_s$ is the range of possible data symbols (e.g., symbols not reserved for control data and/or not utilized for transmitting legacy reference signals, as described below), s is the subframe index, and freq_offset is an initial offset that can depend on a cell and/or antenna port and/or other parameter. Moreover, in an example, puncturing component 208 can select a set of resources for puncturing based at least in part on an MCS selected by encoding component 204.

In any case, transmitting component 210 can transmit codeblocks mapped to the resource elements that are not punctured, and can transmit signals of the disparate technology in the resource elements punctured for signal transmission. It is to be appreciated that where legacy device 104 receives a punctured codeblock, it can still properly decode the codeblock based at least in part on data received over the other resource elements, in one example. In addition, as described above, puncturing component 208 can puncture the codeblock for muting, such that transmitting component 210 can refrain from transmitting over the resource elements corresponding to the punctured portions of the codeblock. For example, the signals can relate to channel state information reference signals (CSI-RS) transmitted in LTE release 10, which device 106 can utilize for reporting channel feedback. Thus, the CSI-RSs can be transmitted at less density and less frequently as other RSs, since it is used for measuring the channel for feedback purposes.

Figure 3:
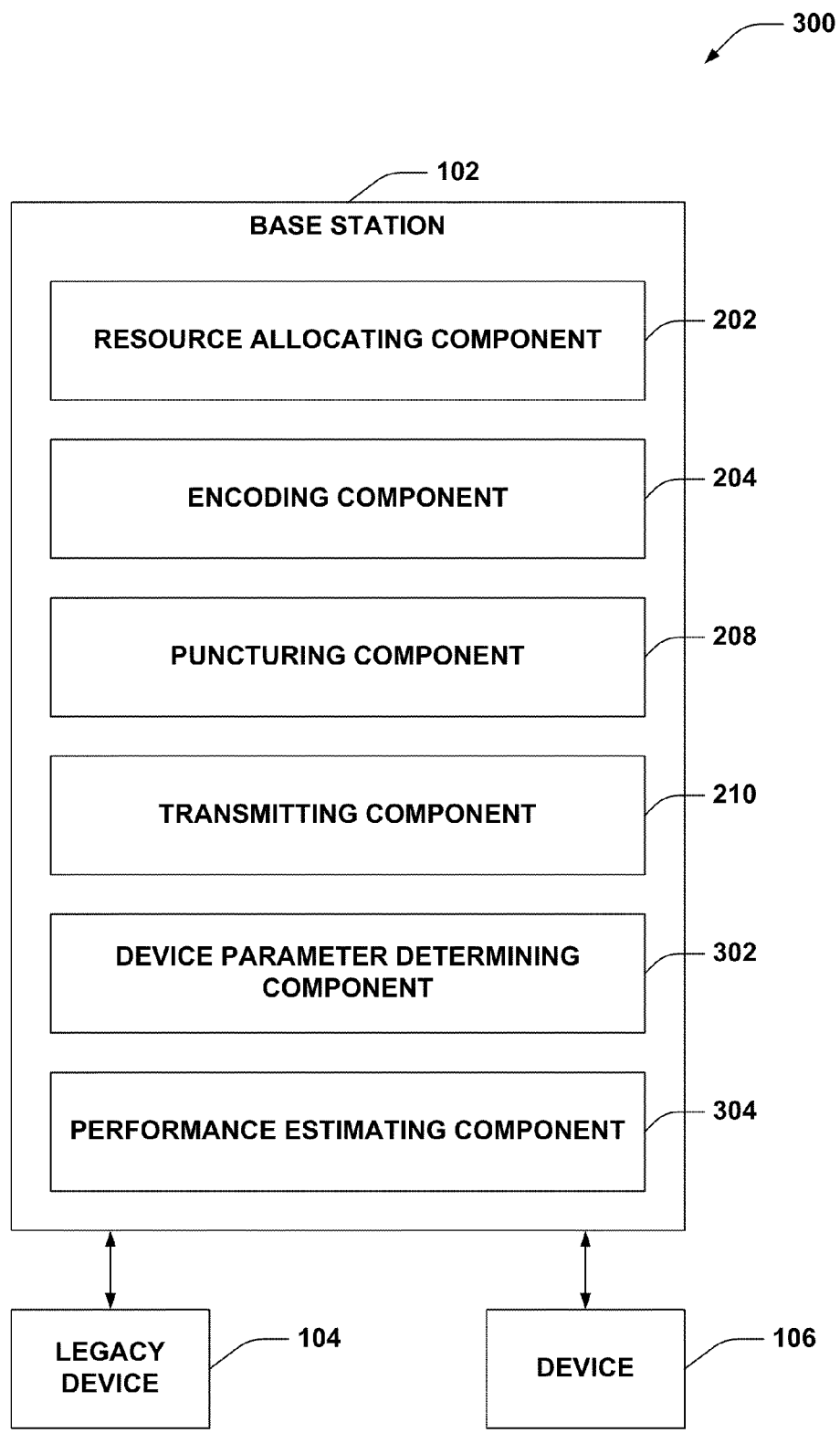
FIG. 3 illustrates an example system that facilitates puncturing codeblocks for transmitting disparate signals or muting.

Referring to FIG. 3, illustrated is an example wireless communications system 300 that punctures signals related to a disparate technology or for muting in a set of data resources. System 300 includes a base station 102, which as described can communicate with a plurality of devices, such as legacy device 104 and device 106, to provide wireless network access thereto. Base station 102 can include a resource allocating component 202 that assigns a set of resources to one or more devices for communicating with base station 102, an encoding component 204 that applies an MCS to data to generate one or more codeblocks for communicating to the one or more devices, a puncturing component 208 that punctures a signal of a disparate technology into at least one of the one or more codeblocks, and a transmitting component 210 that transmits the one or more codeblocks over the set of resources. Base station 102 also comprises a device parameter determining component 302 that can obtain one or more parameters related to a device, and a performance estimating component 304 that can compute a performance parameters related to one or more of the codeblocks or a portion thereof based on puncturing.

According to an example, resource allocating component 202 can assign resources to legacy device 104 and/or device 106 for communicating therewith. For example, in LTE or similar systems, base station 102 can communicate with legacy device 104 (and/or additional legacy devices) over a radio frame, which can comprise one or more subframes that include substantially the same portion of a frequency band in subsets of the period of time that defines the radio frame. Each subframe can include a number of data symbols, which are further portions of the subsets of the period of time that occupy the frequency band. For example, in LTE, one subframe can be transmitted per one millisecond, and can include 14 orthogonal frequency division multiplexing (OFDM) symbols, in a normal cyclic prefix (CP) mode. Moreover, a resource block can be defined as a portion of frequency over a subframe, such that each subframe can have multiple resource blocks defined in frequency. Each resource block can have multiple resource elements, which can each relate to frequency subcarriers in data symbols of the resource block. In LTE normal CP mode, for example, a resource block can include 12 subcarriers over 14 data symbols, where each subcarrier in each data symbol is a resource element (e.g., 168 resource elements, in this example).

Furthermore, for example, a portion of each subframe (e.g., or resource block) can be reserved for control data communications with legacy device 104 and/or other legacy devices. In LTE, for example, the first n OFDM symbols are reserved for control data, where 0≤n≤3. In addition, some OFDM symbols of an LTE subframe can be used for transmitting reference signals to legacy device 104. Thus, for example, resource elements related to control data can be avoided in determining resource elements for transmitting signals of the disparate technology. In addition, data symbols over which legacy reference signals are transmitted can be avoided as well. In this regard, puncturing component 208 can determine a number of resource elements for spacing the signals of the disparate technology substantially equally, as described above, based at least in part on not counting those reserved for control data and avoiding symbols over which legacy reference signals are transmitted.

As described above, puncturing component 208 can puncture a portion of resources assigned to legacy device 104 and/or other legacy devices for transmitting signals related to the disparate technology (e.g., to device 106 or other devices) or for muting. In addition, for example, resource allocating component 202 can receive an indication of resource elements to be punctured from puncturing component 208. For example, this can relate to resource elements to be punctured in a resource block (e.g., repeating each resource block), over a number of resource blocks (e.g., for a given resource block, or set of resource blocks, every n resource blocks, where n is a positive integer), and/or the like. In addition, puncturing component 208 can generate the indication based at least in part on a received or determined puncturing pattern, as described, by selecting the resource elements for puncturing, and/or the like. In this regard, resource allocating component 202 can assign resources to legacy device 104 that avoid punctured resource elements.

In another example, device parameter determining component 302 can obtain one or more parameters related to a device, such as legacy device 104 and/or device 106. For example, the one or more parameters can relate to bandwidth, data rate, or QoS requirements of the device. In this example, resource allocating component 202 can assign resources to the device based at least in part on the puncturing pattern and/or the requirements. For instance, resource allocating component 202 can avoid punctured resources (e.g., as indicated by the puncturing pattern) in assigning resources to a device with high bandwidth, data rate, or QoS requirements. In yet another example, device parameter determining component 302 can obtain a rank or geometry of the device, a selected MCS, etc., and resource allocating component 202 can similarly assign resources based on the rank, geometry, selected MCS, etc. (e.g., avoiding punctured resources for assigning resources to devices of high rank).

Moreover, in an example, encoding component 204 can select an MCS for encoding codeblocks related to legacy device 104 and/or device 106 communications based at least in part on the puncturing pattern. In one example, this can include estimating performance over a codeblock with a largest portion of punctured resource elements (e.g., a most punctured codeblock). In this example, puncturing component 208 can determine and indicate one or more most punctured codeblocks to performance estimating component 304, and performance estimating component 304 can compute a performance over the most punctured codeblock based at least in part on a level of puncturing (e.g., a number of punctured resource elements related to the codeblock), data rate, rank, geometry, or QoS requirements of a related device, historically reported channel information from the related device, and/or the like. Performance estimating component 304 can communicate the performance metric to encoding component 204, which can select the MCS based at least in part on the performance metric.

For example, where performance estimating component 304 estimates a performance metric for a most punctured codeblock, using a given MCS, below a threshold level, encoding component 204 can select or modify an MCS for the related device (e.g., legacy device 104 and/or 106) that improves the estimated performance metric to at least the threshold level. Moreover, in another example, performance estimating component 304 can select or modify the MCS based at least in part on a threshold difference from an estimated performance metric of the most punctured codeblock without puncturing. In one example, performance estimating component 304 can determine an expected error rate of one or more of the codeblocks encoded using a given MCS based at least in part on the puncturing pattern (e.g., as applied to the codeblocks), and can select the MCS based at least in part on the expected error rate. Thus, for example, encoding component 204 can consider a largest MCS, and performance estimating component 304 can determine the expected error rate of the largest MCS given a geometry or one or more metrics of a device (e.g., legacy device 104 and/or device 106), the puncturing pattern, and/or the like. If the error rate is above a threshold level (e.g., 10%), encoding component 204 can select a next largest MCS, and so on until an MCS is reached for which performance estimating component 304 determines an expected error rate at or below the threshold level.

Figure 4:
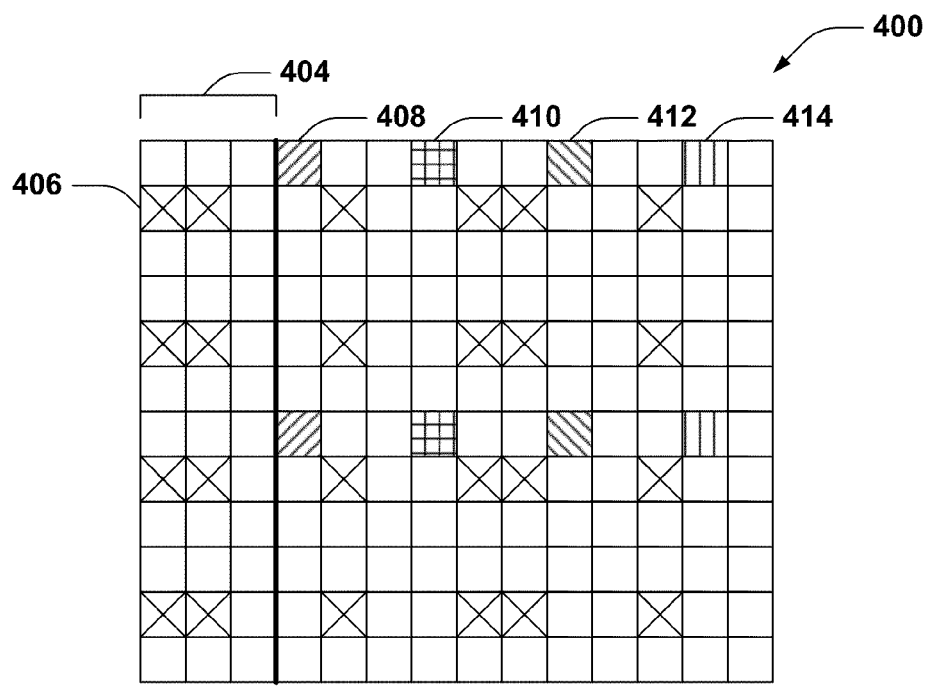
FIG. 4 illustrates example resource blocks having resource elements over which disparate signals are punctured into codeblocks and transmitted.
Figure 4:
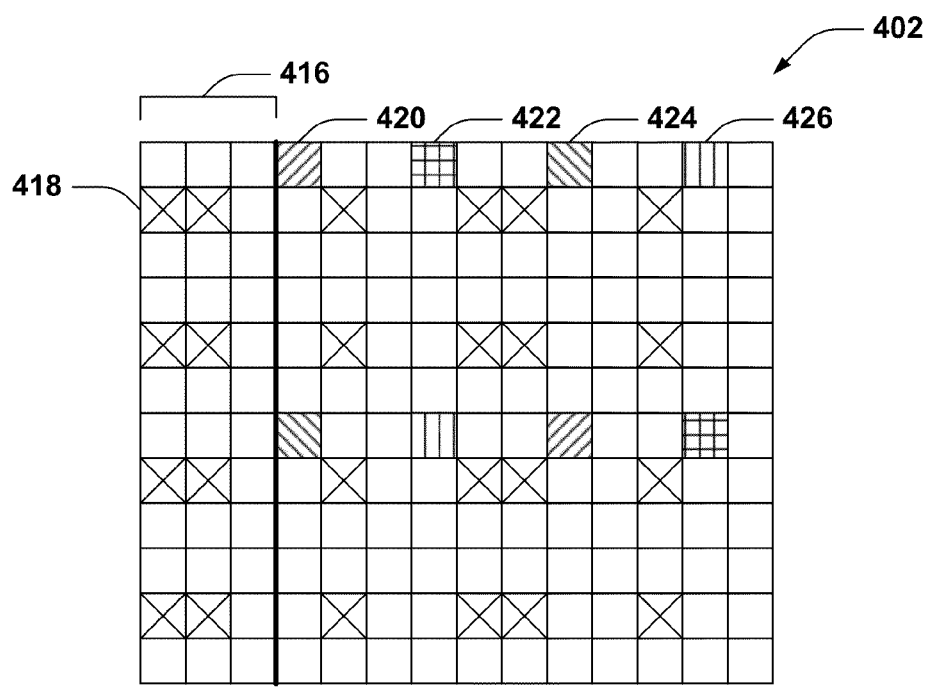

Turning now to FIG. 4, example resource blocks 400 and 402 are illustrated that include a number of resource elements punctured according to a puncturing pattern for transmitting signals of a disparate technology type. Resource block 400, as described, can have 14 data symbols (e.g., OFDM symbols), each comprising 12 subcarriers, where each subcarrier in each data symbol corresponds to a resource element to which codeblocks are mapped. As described, resource block 400 can have up to 3 initial data symbols 404 reserved for control data communications, and the remaining data symbols can relate to a PDSCH or similar shared data channel. In addition, for example, resource block 400 can have resource elements 406, and similarly patterned resource elements, reserved for transmitting legacy reference signals, such as common reference signals (CRS) in LTE. In this regard, signals for the disparate technology type are not punctured in symbols reserved for control data or those over which legacy reference signals are transmitted, so as not to interfere with more critical signals, in this example.

Instead, as described, signals for the disparate technology type are punctured in resource elements 408, 410, 412, 414, and similarly patterned resource elements. Thus, for example, in resource block 400, the same signal is punctured in two resource elements of the data symbol comprising resource element 408, and so on. Resource elements 410, 412, and 414, as well as similarly patterned resource elements in the same data symbol, are punctured for transmitting different signals of the disparate technology. In one example, the signals can relate to four different reference signals (e.g., pertaining to four antenna ports), with a specified density of two resource elements per resource block. Thus, as depicted, the resource elements of resource block 400 are substantially equally punctured such that codeblocks in the resource elements are similarly impacted by the puncturing. In this example, punctured resource elements are spread substantially equally over frequency and then over time (e.g., over the data symbols).

Moreover, resource block 402 can have substantially the same resource blocks punctured as resource block 400, but the signals can be spread across the data symbols. Thus, resource block includes a control data region 416 and resource elements reserved for transmitting legacy reference signals, which are resource element 418 and similarly patterned elements. After the control region 416, resource elements 420 and similarly patterned elements are punctured for transmitting new signals. In this resource block 402, resource element 420 is punctured and a resource element in the tenth data symbol (e.g., the data symbol with punctured resource element 424) for transmitting the same signal. Moreover, as described, resource elements 422, 424, and 426, and similarly patterned resource elements in different data symbols, are punctured for transmitting different signals of the disparate technology. In one example, the signals can relate to CSI-RS, as described above. Since CSI-RS transmissions of one antenna port uses power of one antenna port, such a design allows making use of the power of the other antenna ports not used on the CSI-RS transmission of one antenna port to power boost the CSI-RS of the other antenna ports that are present on the same OFDM symbol. Furthermore, it is to be appreciated, as described, that resource elements 408, 410, 412, 414, 420, 422, 424, 426, and similarly patterned resource elements, can be punctured for muting transmissions, in one example.

It is to be appreciated that the puncturing patterns depicted for resource blocks 400 and 402 are but two possible puncturing patterns that space puncturing substantially evenly across the resource blocks. Substantially limitless other puncturing patterns are possible, including patterns that do not space puncturing substantially evenly across the resource block. For example, resource elements in a single given data symbol can be punctured so as to impact the least number of time resources of the resource block. In any case, resources can be allocated and/or an MCS can be chosen based at least in part on the puncturing. Thus, for example, an MCS can be selected based on a most punctured codeblock, which can relate to a codeblock over the resource elements of the punctured data symbol.

Referring to FIGS. 5-8, example methodologies relating to puncturing codeblocks to transmit other signals or mute transmissions are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
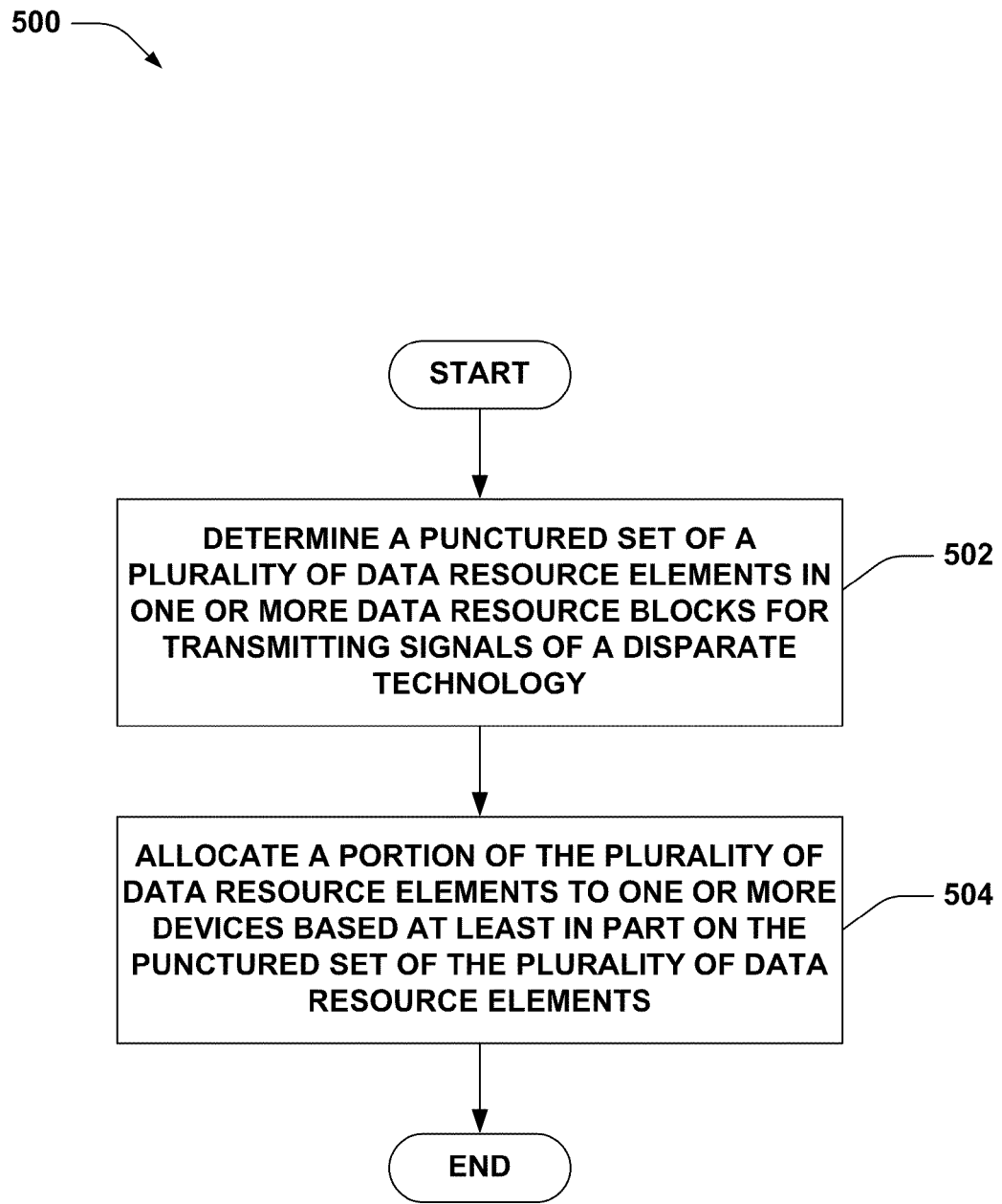
FIG. 5 illustrates an example methodology that facilitates assigning resources based at least in part on a set of punctured resources.

Referring to FIG. 5, an example methodology 500 is displayed that facilitates allocating resources to devices according to a punctured set of the resources. At 502, a punctured set of a plurality of data resource elements in one or more data resource blocks can be determined for transmitting signals of a disparate technology. As described, the punctured set of data resource elements can be determined according to a received puncturing pattern, selected based on one or more parameters, and/or the like. Moreover, the punctured set of data resource elements can be spread substantially evenly across the data resource block, in one example. At 504, a portion of the plurality of data resource elements can be allocated to one or more devices based at least in part on the punctured set of the plurality of data resource elements. Thus, in an example, resource elements in the punctured set can be avoided for certain devices, such as legacy devices, devices having certain QoS, bandwidth, data rate, or other requirements, and/or the like. Moreover, in an example, an MCS can be selected based on the punctured set of data resource elements as well.

Figure 6:
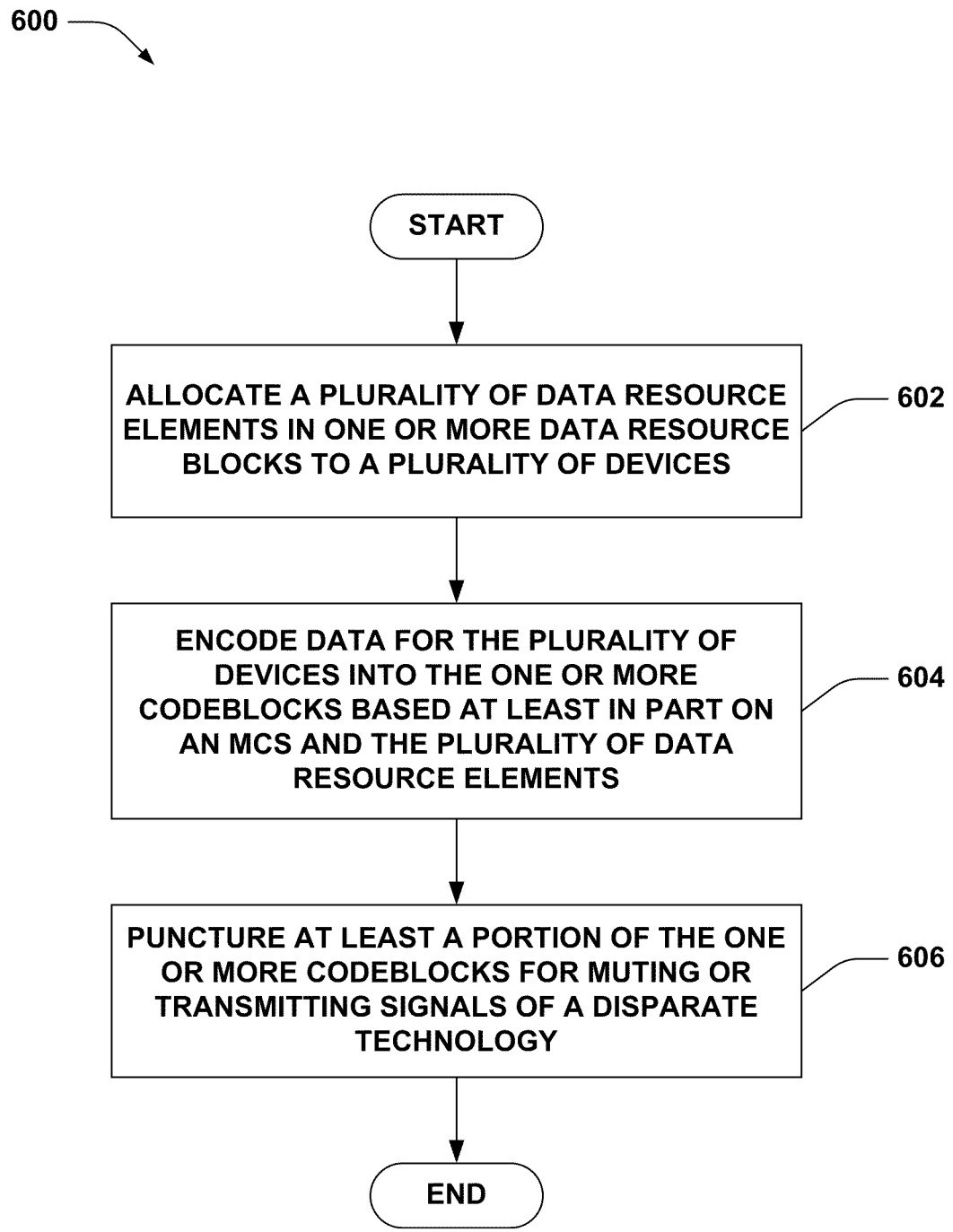
FIG. 6 illustrates an example methodology that facilitates puncturing codeblocks for muting or transmitting signals of a disparate technology.

Turning to FIG. 6, an example methodology 600 is displayed that facilitates puncturing codeblocks to transmit signals of a disparate technology or for muting. At 602, a plurality of data resource elements in one or more data resource blocks can be allocated to a plurality of devices. In an example, the data resource blocks can be part of a shared data channel over which multiple devices can receive communications. At 604, data for the plurality of devices can be encoded into one or more codeblocks based at least in part on an MCS and the plurality of data resource elements. Thus, for example, the one or more codeblocks can be mapped over the data resource elements for transmission to the plurality of devices. As described, codeblocks can be mapped over the data resource elements in order of frequency for a given data symbol and then across data symbols. At 606, at least a portion of the one or more codeblocks can be punctured for muting or transmitting signals of a disparate technology. As described above, the puncturing can impact the codeblocks substantially equally.

In this regard, data resource elements for puncturing can be selected to have substantially even spacing between data resource elements over frequency and then also over time, as described. Moreover, the signals can relate to reference signals, such as CSI-RS, and/or the like. In addition, allocating data resource elements at 602 can be based on the puncturing, as described herein.

Figure 7:
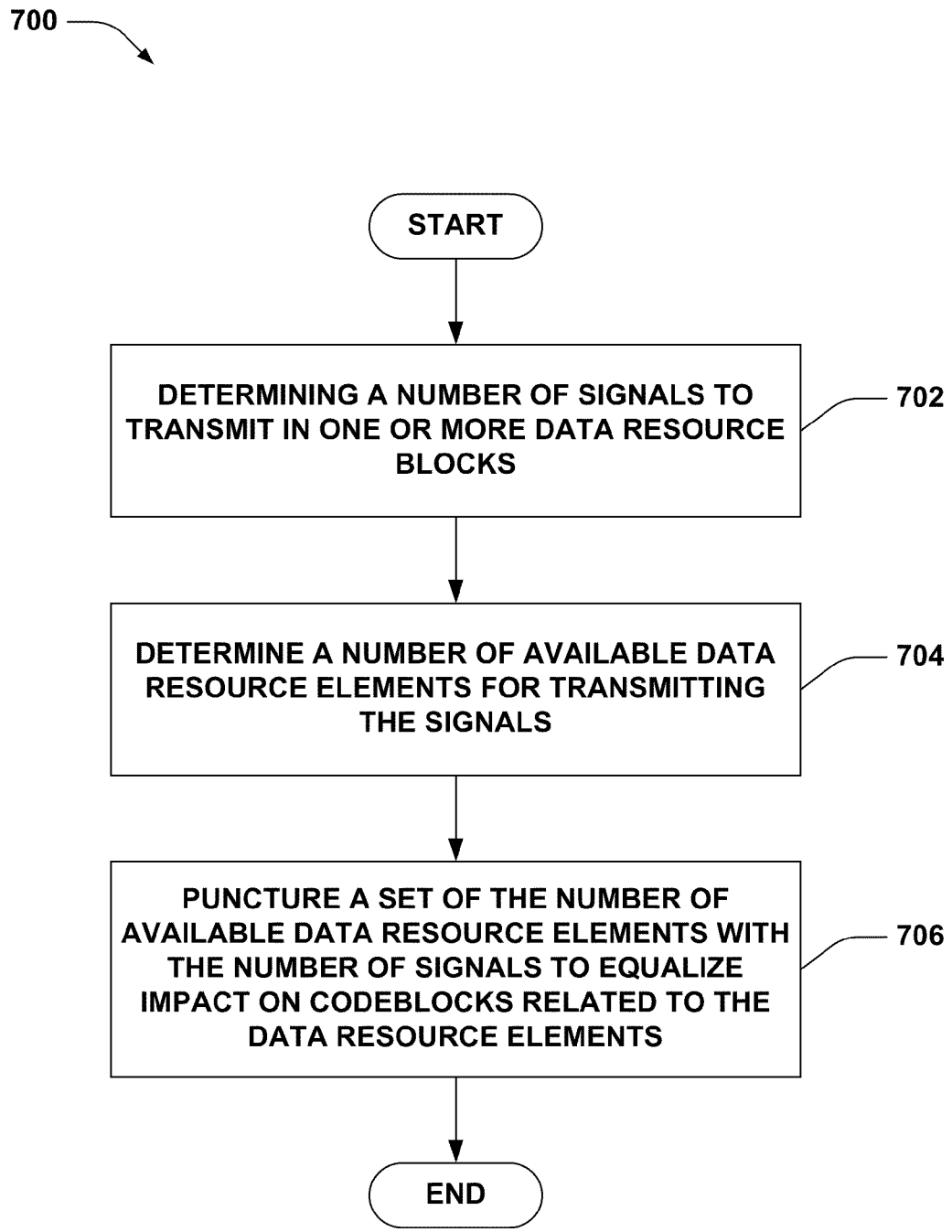
FIG. 7 illustrates an example methodology for transmitting a number of signals over a number of data resource elements.

Referring to FIG. 7, illustrated is an example methodology 700 for puncturing data resource elements with other signals. At 702, a number of signals to transmit in one or more data resource blocks can be determined. As described, for example, the signals can be of a disparate technology. In one example, the signals can be CSI-RS or similar reference signals, and the number of signals can be determined based at least in part on a number of antenna ports and a density for transmitting the signals, as described. At 704, a number of available data resource elements can be determined for transmitting the signals. For example, the number of available data resource elements can relate to a number of data resource elements in one or more data resource blocks, and can exclude data resource elements reserved for control data transmissions, those in a symbol related to transmitting legacy reference signals, and/or the like, as described. At 706, a set of the number of available data resource elements can be punctured with the number of signals to equalize impact on codeblocks related to the data resource elements. Thus, as described, this can include selecting the set of the number of available data resource elements to puncture leaving substantially equal space between resource elements over frequency and then over time, depending on the number of signals to transmit.

Figure 8:
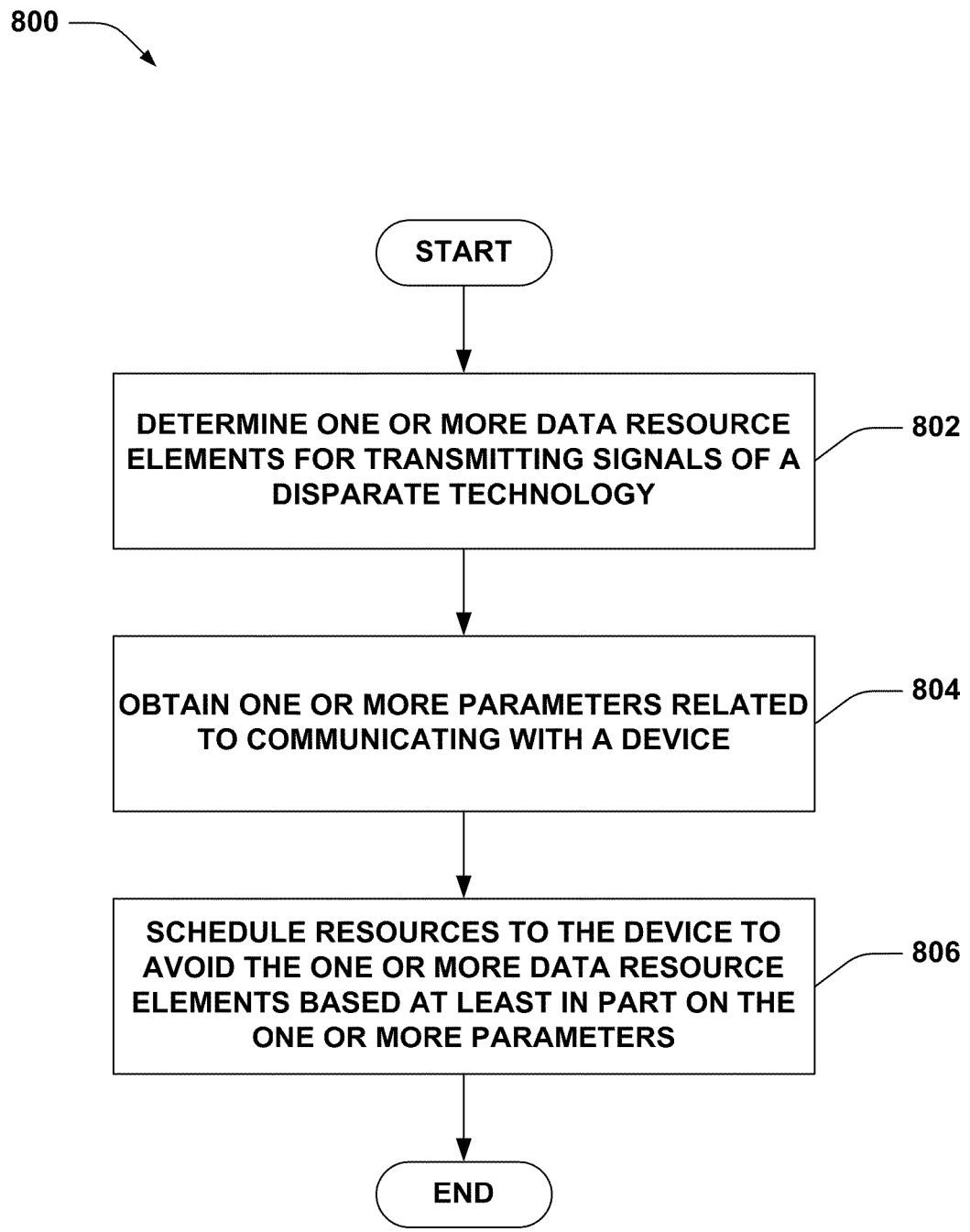
FIG. 8 illustrates an example methodology that facilitates scheduling resources according to punctured codeblocks.

Turning now to FIG. 8, an example methodology 800 that facilitates allocating resources according to puncturing is illustrated. At 802, one or more data resource elements for transmitting signals of a disparate technology can be determined. At 804, one or more parameters related to communicating with a device can be obtained. As described, the one or more parameters can relate to whether the device is a legacy device, the bandwidth allocated to the device, data rate, or QoS requirements for the device, rank or geometry of the device, and/or the like. At 806, resources can be scheduled to the device to avoid the one or more data resource elements based at least in part on the one or more parameters. Thus, for example, devices with high bandwidth, data rate, or QoS requirements, as related to other devices or threshold levels, can be scheduled on data resource elements other than those related to puncturing, while other devices can be scheduled on such resources, as described.

It will be appreciated that, in accordance with one or more aspects described herein, inferences can be made regarding selecting data resource elements for puncturing to minimize impact of codeblocks, determining an MCS for generating the codeblocks based on the puncturing, allocating resources to devices based on the puncturing, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
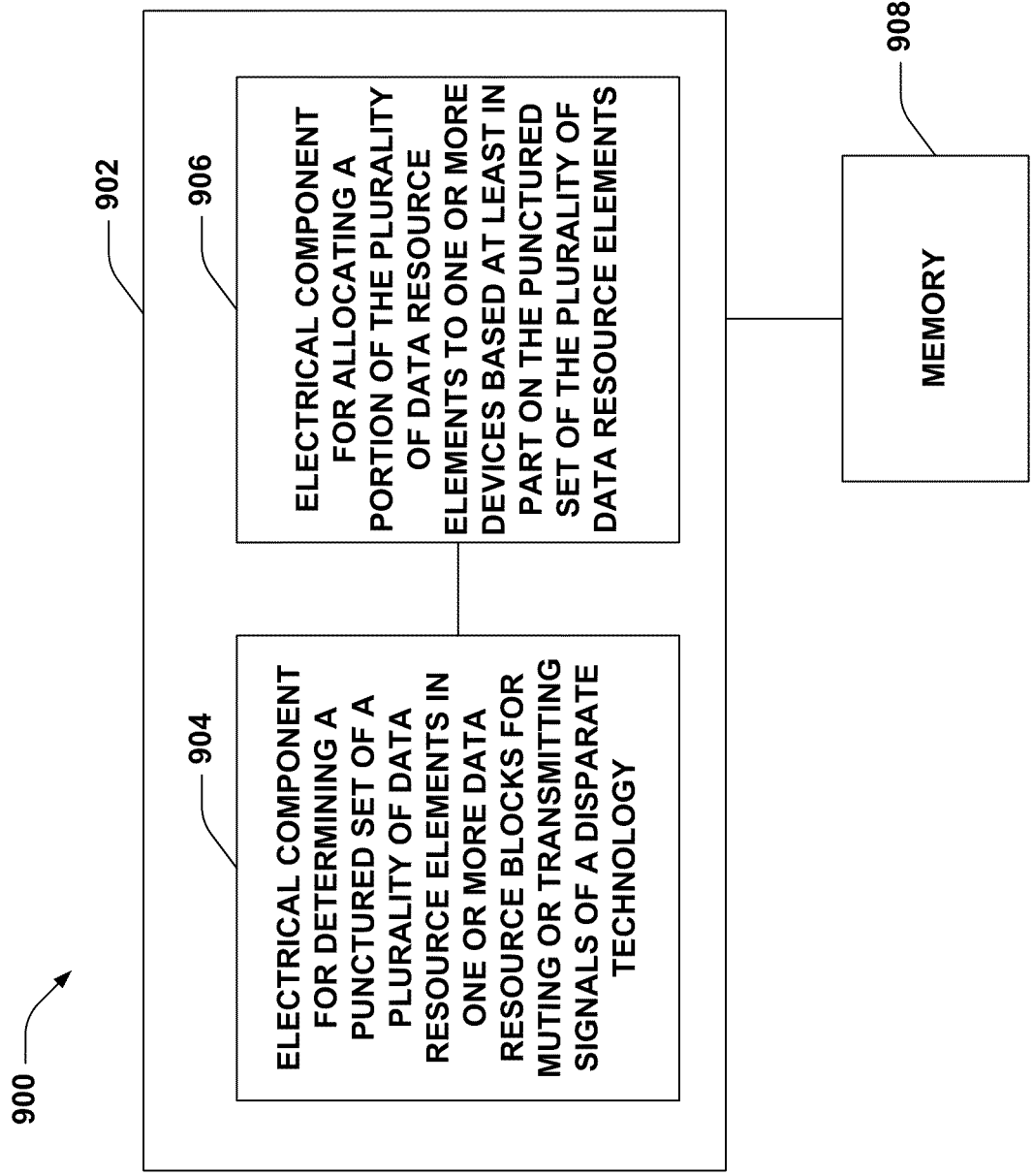
FIG. 9 illustrates an example system for assigning resources based at least in part on a set of punctured resources.

With reference to FIG. 9, illustrated is a system 900 that assigns resources to devices based at least in part on a punctured set of resources. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for determining a punctured set of a plurality of data resource elements in one or more data resource blocks for muting or transmitting signals over a disparate technology 904. As described, the punctured set of data resource elements can be determined according to a received puncturing pattern, selected based on one or more parameters, and/or the like. Moreover, the punctured set of data resource elements can be spread substantially evenly across the data resource block, in one example, or otherwise.

Further, logical grouping 902 can comprise an electrical component for allocating a portion of the plurality of data resources elements to one or more devices based at least in part on the punctured set of the plurality of data resource elements 906. As described, for example, resource elements in the punctured set can be avoided for certain devices, such as legacy devices, devices having certain QoS, bandwidth, data rate, or other requirements, and/or the like. Additionally, system 900 can include a memory 908 that retains instructions for executing functions associated with the electrical components 904 and 906. While shown as being external to memory 908, it is to be understood that one or more of the electrical components 904 and 906 can exist within memory 908.

Figure 10:
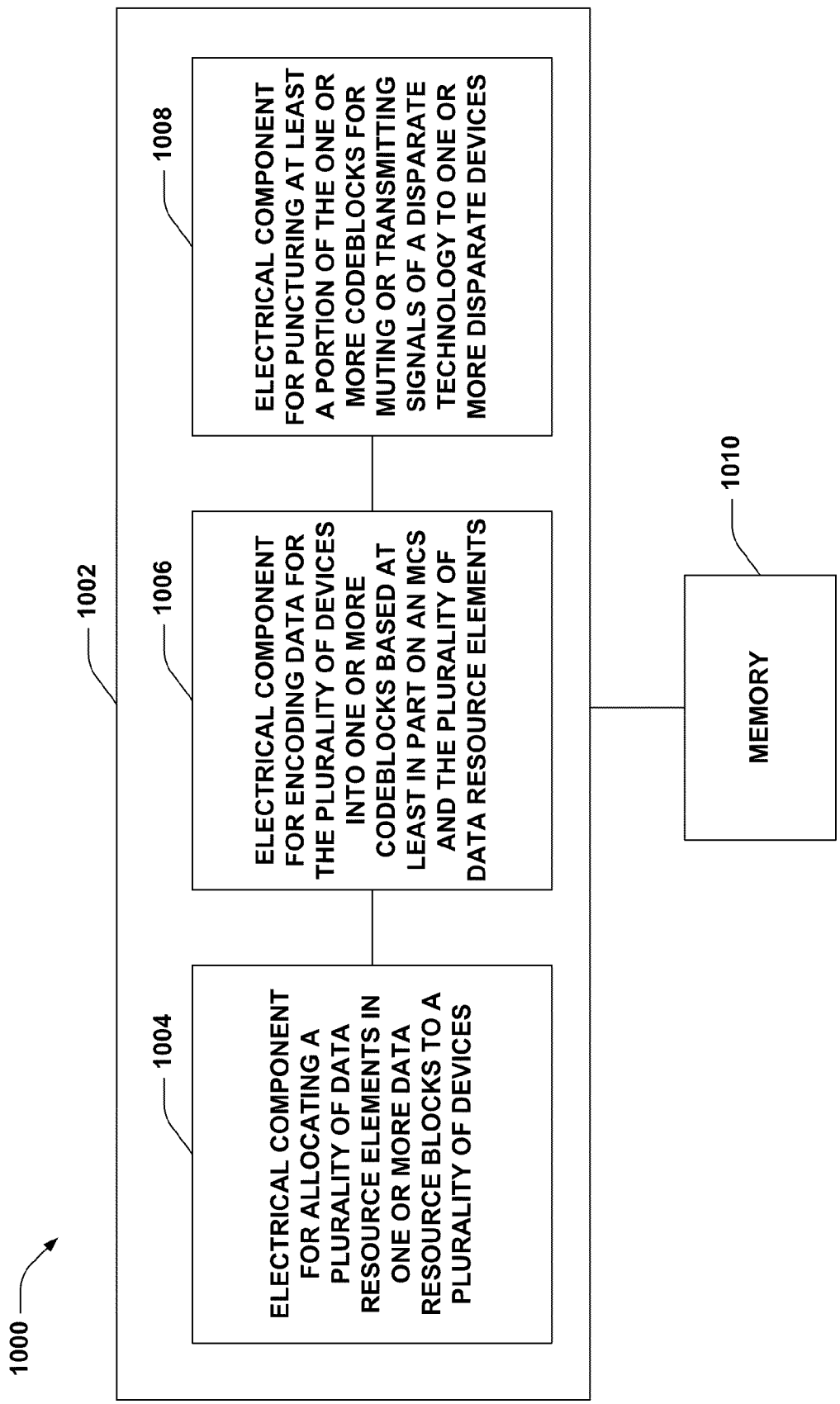
FIG. 10 illustrates an example system that facilitates puncturing codeblocks for muting or transmitting signals of a disparate technology.

With reference to FIG. 10, illustrated is a system 1000 that punctures a set of data resource elements for muting or with signals of a disparate technology. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for allocating a plurality of data resource elements in one or more data resource blocks to a plurality of devices 1004. For example, as described, the data resource blocks can relate to a shared data channel for a plurality of devices. Further, logical grouping 1002 can comprise an electrical component for encoding data for the plurality of devices into one or more codeblocks based at least in part on an MCS and the plurality of data resource elements 1006.

As described, for example, electrical component 1006 can encode the codeblocks over the plurality of data resource elements sequentially over frequency and then over time (e.g., over frequency of a data symbol before moving to a next data symbol). Moreover, logical grouping 1002 can comprise an electrical component for puncturing at least a portion of the one or more codeblocks for muting or transmitting signals of a disparate technology to one or more disparate devices 1008. As described, electrical component 1008 can puncture the one or more codeblocks transmitting the signals in data resource elements that are substantially evenly spaced apart in the data resource block. Thus, for example, since electrical component 1006 can encode codeblocks over the data resource elements over frequency first and then time, the codeblocks can be similarly impacted by the substantially evenly spaced puncturing. Additionally, system 1000 can include a memory 1010 that retains instructions for executing functions associated with the electrical components 1004, 1006, and 1008. While shown as being external to memory 1010, it is to be understood that one or more of the electrical components 1004, 1006, and 1008 can exist within memory 1010.

Figure 11:
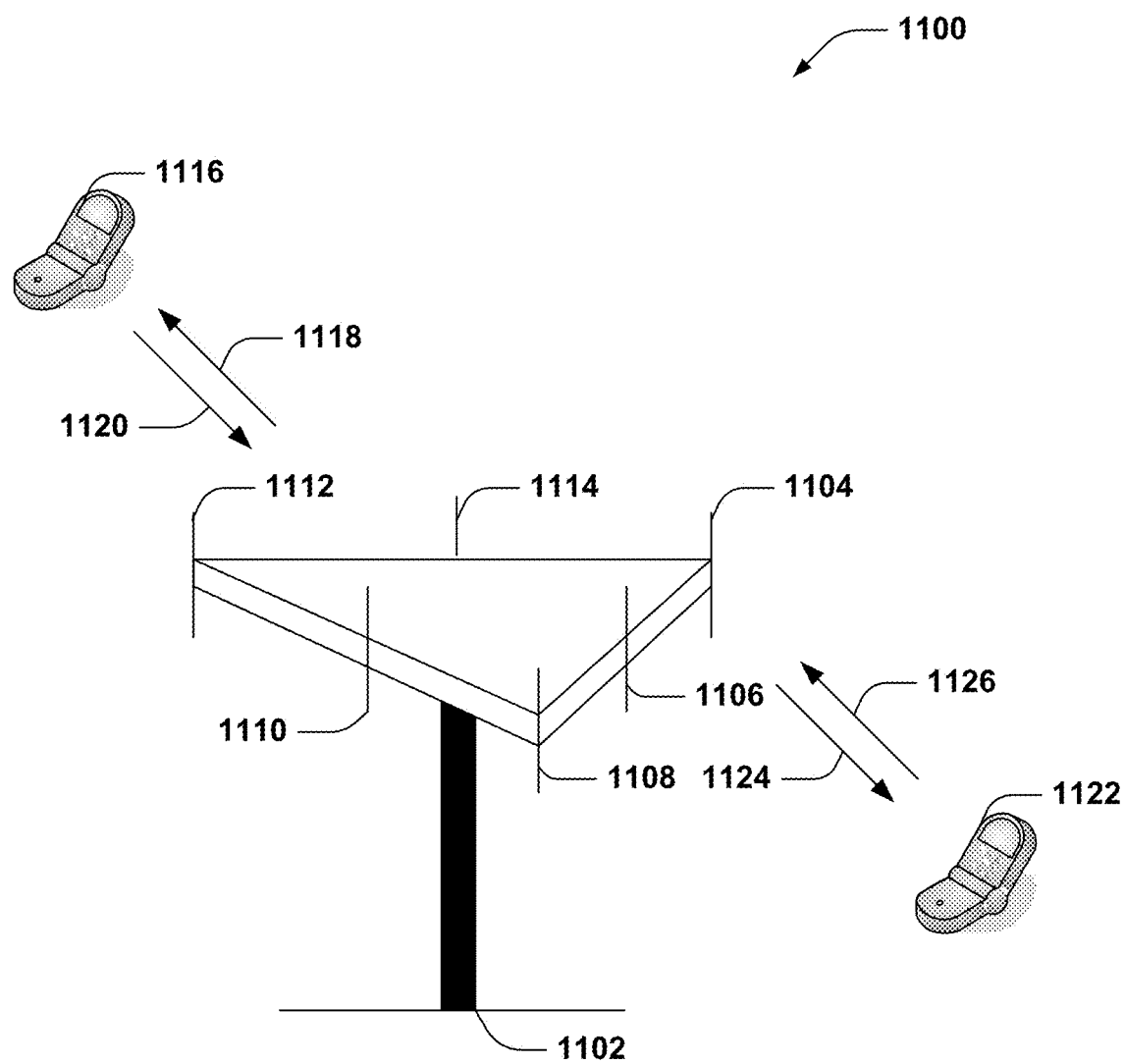
FIG. 11 illustrates an example wireless communication system in accordance with various aspects set forth herein.

Referring now to FIG. 11, a wireless communication system 1100 is illustrated in accordance with various embodiments presented herein. System 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system.

Figure 12:
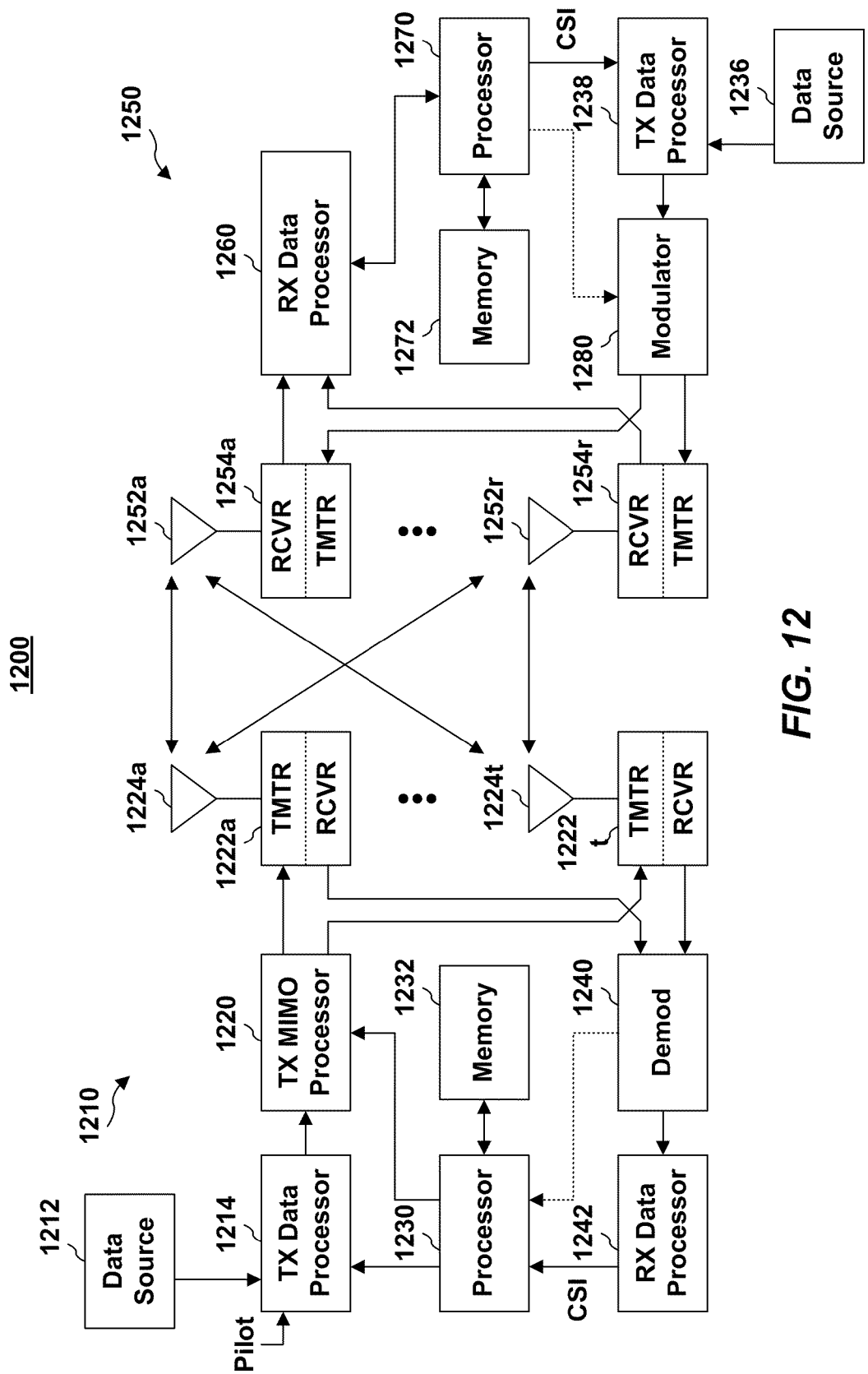
FIG. 12 illustrates an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-3 and 9-11), resource blocks (FIG. 4), and/or methods (FIGS. 5-8) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides NT modulation symbol streams to NT transmitters (TMTR) 1222$a$ through 1222$t$. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1222$a$ through 1222$t$ are transmitted from NT antennas 1224$a$ through 1224$t$, respectively.

At mobile device 1250, the transmitted modulated signals are received by NR antennas 1252$a$ through 1252$r$ and the received signal from each antenna 1252 is provided to a respective receiver (RCVR) 1254$a$ through 1254$r$. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the NR received symbol streams from NR receivers 1254 based on a particular receiver processing technique to provide NT "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254$a$ through 1254$r$, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
    determining a punctured set of a plurality of data resource elements in one or more data resource blocks for muting or transmitting signals of a disparate technology;
    allocating a portion of the plurality of data resource elements to in the one or more data resource blocks to one or more devices based at least in part on the punctured set of the plurality of data resource elements, wherein the allocating the portion of data resource elements includes allocating resources to devices that cannot process the disparate signals based on avoiding data resource elements that are associated with the punctured set;
    selecting a modulation and coding scheme (MCS) for encoding data over the portion of the plurality of data resource elements based at least in part on the punctured set, wherein the selecting the MCS includes determining a codeblock of a plurality of codeblocks mapped over the portion of the plurality of data resource elements that includes a largest portion of the punctured set and computing an expected performance of the one or more codeblocks, wherein the computing the expected performance includes computing an expected performance of said determined codeblock when being punctured, and wherein the selecting the MCS is based further at least in part on the expected performance;
    encoding the data for the one or more devices into the one or more codeblocks for transmission over the portion of the plurality of data resource elements using the selected MCS; and
    puncturing the one or more codeblocks by replacing data values in codeblocks corresponding to the resource elements with disparate values according to the punctured set,
    wherein the signals of a disparate technology comprise reference signals.

2. The method of claim 1, wherein the computing the expected performance is further based at least in part on determining an expected error rate of the one or more codeblocks using the MCS.

3. The method of claim 1, wherein the allocating the plurality of data resource elements is based further at least in part on a rank, a quality of service, a geometry, or a selected modulation and coding scheme (MCS) of the one or more devices.

4. The method of claim 1, wherein the allocating the plurality of data resource elements is based further at least in part on whether the one or more devices can process channel state information reference signals (CSI-RS) of the disparate technology.

5. The method of claim 1, wherein the punctured set of the plurality of data resource elements are distributed evenly across the plurality of data resource elements.

6. The method of claim 1, further comprising selecting the punctured set of the plurality of data resource elements based at least in part on a modulation and coding scheme (MCS) selected for encoding data related to the one or more devices.

7. The method of claim 6, wherein the selecting is performed dynamically for a given period of time.

8. The method of claim 1, wherein the punctured set of the plurality of data resource elements is configured to avoid data symbols of the one or more resource blocks that include common reference signals.

9. The method of claim 8, wherein the punctured set of the plurality of data resource elements are included one or more subcarriers of the resource block that do not include the common reference signals.

10. The method of claim 1, wherein, for each of the one or more resource blocks, the allocated portion of the plurality of data resource elements is distinct from the punctured set of the plurality of data resource elements, wherein, for each of the one or more resource blocks, the signals of the disparate technology are positioned within a first set of symbols and legacy reference signals are positioned within a second set of symbols that is different from the first set of symbols, and wherein, for each of the one or more resource blocks, the signals of the disparate technology are positioned within a first set of sub-carriers and the legacy reference signals are positioned within a second set of sub-carriers that is different from the first set of sub-carriers.

11. An apparatus for wireless communication, comprising:
    at least one processor; and
    a memory coupled to the at least one processor, wherein the memory stores instructions that, when executed by the at least one processor, cause the apparatus to:
        determine a punctured set of a plurality of data resource elements in one or more resource blocks for muting or transmitting signals of a disparate technology;
        allocate a portion of the plurality of data resource elements to one or more devices based at least in part on the punctured set of the plurality of data resource elements, wherein the allocating the portion of data resource elements includes allocating resources to devices that cannot process the disparate signals based on avoiding data resource elements that are associated with the punctured set;
        select modulation and coding scheme (MCS) for encoding data over the portion of the plurality of data resource elements based at least in part on the punctured set, wherein the selecting the MCS comprises determining a codeblock of a plurality of codeblocks mapped over the portion of the plurality of data resource elements that includes a largest portion of the punctured set and computing an expected performance of the one or more codeblocks, wherein the computing the expected performance includes computing an expected performance of said determined codeblock when being punctured, and wherein the selecting the MCS is based further at least in part on the expected performance;

encode the data for the one or more devices into the one or more codeblocks for transmission over the portion of the plurality of data resource elements using the selected MCS; and puncture the one or more codeblocks by replacing data values in codeblocks corresponding to the resource elements with disparate values according to the punctured set, wherein the signals of a disparate technology comprise reference signals.

12. The apparatus of claim 11, wherein the at least one processor determines the expected performance further based at least in part on determining an expected error rate of the one or more codeblocks using the MCS.

13. The apparatus of claim 11, wherein the at least one processor allocates the plurality of data resource elements based further at least in part on a rank, a quality of service, a geometry, or a selected modulation and coding scheme (MCS) of the one or more devices.

14. The apparatus of claim 11, wherein the at least one processor allocates the plurality of data resource elements based further at least in part on whether the one or more devices can process channel state information reference signals (CSI-RS) of the disparate technology.

15. The apparatus of claim 11, wherein the punctured set of the plurality of data resource elements are distributed evenly across the plurality of data resource elements.

16. The apparatus of claim 11, wherein the at least one processor is further configured to select the punctured set of the plurality of data resource elements based at least in part on a modulation and coding scheme (MCS) selected for encoding data related to the one or more devices.

17. The apparatus of claim 16, wherein the at least one processor dynamically selects the punctured set of the plurality of data resource elements.

18. The apparatus of claim 11, wherein, for each of the one or more resource blocks, the allocated portion of the plurality of data resource elements is distinct from the punctured set of the plurality of data resource elements, wherein, for each of the one or more resource blocks, the signals of the disparate technology are positioned within a first set of symbols and legacy reference signals are positioned within a second set of symbols that is different from the first set of symbols, and wherein, for each of the one or more resource blocks, the signals of the disparate technology are positioned within a first set of sub-carriers and the legacy reference signals are positioned within a second set of sub-carriers that is different from the first set of sub-carriers.

19. An apparatus for wireless communication, comprising:

means for determining a punctured set of a plurality of data resource elements in one or more resource blocks for muting or transmitting signals of a disparate technology;

means for allocating a portion of the plurality of data resource elements to one or more devices based at least in part on the punctured set of the plurality of data resource elements, wherein the allocating the portion of data resource elements includes allocating resources to devices that cannot process the disparate signals based on avoiding data resource elements that are associated with the punctured set;

means for selecting a modulation and coding scheme (MCS) for encoding data over the portion of the plurality of data resource elements based at least in part on the punctured set, wherein the selecting the MCS comprises determining a codeblock of a plurality of codeblocks mapped over the portion of the plurality of data resource elements that includes a largest portion of the punctured set and computing an expected performance of the one or more codeblocks, wherein the computing the expected performance includes computing an expected performance of said determined codeblock when being punctured, and wherein the selecting the MCS is based further at least in part on the expected performance;

means for encoding the data for the one or more devices into the one or more codeblocks for transmission over the portion of the plurality of data resource elements using the selected MCS; and means for puncturing the one or more codeblocks by replacing data values in codeblocks corresponding to the resource elements with disparate values according to the punctured set, wherein the signals of a disparate technology comprise reference signals.

20. The apparatus of claim 19, wherein the means for computing computes the expected performance further based at least in part on determining an expected error rate of the one or more codeblocks using the MCS.

21. The apparatus of claim 19, wherein the means for allocating allocates the plurality of data resource elements based further at least in part on a rank, a quality of service, a geometry, or a selected modulation and coding scheme (MCS) of the one or more devices.

22. The apparatus of claim 19, wherein the means for allocating allocates the plurality of data resource elements based further at least in part on whether the one or more devices can process channel state information reference signals (CSI-RS) of the disparate technology.

23. The apparatus of claim 19, wherein the punctured set of the plurality of data resource elements are distributed evenly across the plurality of data resources.

24. The apparatus of claim 19, wherein the means for determining further selects the punctured set of the plurality of data resource elements based at least in part on a modulation and coding scheme (MCS) selected for encoding data related to the one or more devices.

25. The apparatus of claim 24, wherein the means for determining dynamically selects the punctured set of the plurality of data resource elements in a given time period.

26. The apparatus of claim 19, wherein, for each of the one or more resource blocks, the allocated portion of the plurality of data resource elements is distinct from the punctured set of the plurality of data resource elements, and wherein, for each of the one or more resource blocks, the signals of the disparate technology are positioned within a first set of symbols and legacy reference signals are positioned within a second set of symbols that is different from the first set of symbols, and wherein, for each of the one or more resource blocks, the signals of the disparate technology are positioned within a first set of sub-carriers and the legacy reference signals are positioned within a second set of sub-carriers that is different from the first set of sub-carriers.

27. A non-transitory computer-readable storage medium, comprising:
instructions for causing at least one computer to determine a punctured set of a plurality of data resource elements in one or more resource blocks for muting or transmitting signals of a disparate technology;
instructions for causing the at least one computer to allocate a portion of the plurality of data resource elements to one or more devices based at least in part on the punctured set of the plurality of data resource elements, wherein the allocating the portion of data resource elements includes allocating resources to devices that cannot process the disparate signals based on avoiding data resource elements that are associated with the punctured set;
instructions for selecting a modulation and coding scheme (MCS) for encoding data over the portion of the plurality of data resource elements based at least in part on the punctured set, wherein the selecting the MCS comprises determining a codeblock of a plurality of codeblocks mapped over the portion of the plurality of data resource elements that includes a largest portion of the punctured set and computing an expected performance of the one or more codeblocks, wherein the computing the expected performance includes computing an expected performance of said determined codeblock when being punctured, and wherein the selecting the MCS is based further at least in part on the expected performance;
instructions for encoding the data for the one or more devices into the one or more codeblocks for transmission over the portion of the plurality of data resource elements using the selected MCS; and
instructions for puncturing the one or more codeblocks by replacing data values in codeblocks corresponding to the resource elements with disparate values according to the punctured set,
wherein the signals of a disparate technology comprise reference signals.

28. The non-transitory computer-readable medium of claim 27, wherein the non-transitory computer-readable medium further comprises instructions for causing the at least one computer to determine the expected performance by determining at least an expected performance of the codeblock based on an expected error rate of the one or more codeblocks.

29. The non-transitory computer-readable medium of claim 27, wherein the instructions for causing the at least one computer to allocate allocates the plurality of data resource elements based further at least in part on a rank, a quality of service, a geometry, or a selected modulation and coding scheme (MCS) of the one or more devices.

30. The non-transitory computer-readable medium of claim 27, wherein the instructions for causing the at least one computer to allocate allocates the plurality of data resource elements based further at least in part on whether the one or more devices can process channel state information reference signal (CSI-RS) of the disparate technology.

31. The non-transitory computer-readable medium of claim 27, wherein the punctured set of the plurality of data resource elements are distributed evenly across the plurality of data resources.

32. The non-transitory computer-readable medium of claim 27, wherein the computer-readable medium further comprises instructions for causing the at least one computer to dynamically select the punctured set of the plurality of data resource elements based at least in part on a modulation and coding scheme (MCS) selected for encoding data related to the one or more devices.

33. The non-transitory computer-readable storage medium of claim 27, wherein, for each of the one or more resource blocks, the allocated portion of the plurality of data resource elements is distinct from the punctured set of the plurality of data resource elements, wherein, for each of the one or more resource blocks, the signals of the disparate technology are positioned within a first set of symbols and legacy reference signals are positioned within a second set of symbols that is different from the first set of symbols, and wherein, for each of the one or more resource blocks, the signals of the disparate technology are positioned within a first set of sub-carriers and the legacy reference signals are positioned within a second set of sub-carriers that is different from the first set of sub-carriers.

* * * * *